(12) United States Patent
Kim

(10) Patent No.: US 7,397,749 B2
(45) Date of Patent: Jul. 8, 2008

(54) OPTICAL WRITING APPARATUS AND METHOD FOR CONTROLLING EXECUTION TIME OF WRITING THEREOF

(75) Inventor: Eun-mi Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 813 days.

(21) Appl. No.: 10/962,535

(22) Filed: Oct. 13, 2004

(65) Prior Publication Data
US 2005/0281159 A1 Dec. 22, 2005

(30) Foreign Application Priority Data
Jun. 22, 2004 (KR) ............. 10-2004-0046529

(51) Int. Cl.
G11B 27/36 (2006.01)
G11B 7/00 (2006.01)
G11B 20/10 (2006.01)

(52) U.S. Cl. ............ 369/53.31; 369/53.37; 369/47.11

(58) Field of Classification Search .......... 369/47.11, 369/53.31, 53.34, 53.37, 44.29, 44.34, 32.02
See application file for complete search history.

(56) References Cited

U.S. PATENT DOCUMENTS

| | | | | |
|---|---|---|---|---|
| 4,817,068 A | * | 3/1989 | Yamauchi | ............. 369/30.36 |
| 5,508,988 A | * | 4/1996 | Nonaka et al. | ........... 369/53.24 |
| 5,633,841 A | * | 5/1997 | Yokota et al. | ............ 369/30.23 |
| 5,889,745 A | * | 3/1999 | Aramaki | .................. 369/53.34 |
| 6,795,382 B2 | * | 9/2004 | Kitamura et al. | ......... 369/47.11 |
| 6,906,988 B1 | * | 6/2005 | Furukawa et al. | ........ 369/53.37 |

OTHER PUBLICATIONS

Korean Patent Abstract for Patent Registration No. 0063015 filed Oct. 25, 2000 (Abstract Only).
"Operating Instructions DVD Recorder RDR-GX3", XP002443253, Sony Corporation, 2003, 99 pgs (in English).

* cited by examiner

*Primary Examiner*—Thang V. Tran
(74) *Attorney, Agent, or Firm*—Staas & Halsey LLP

(57) ABSTRACT

A method of controlling an optical writing apparatus and an optical writing apparatus utilizing the method to control its write execution time include a pickup to write write data onto a writing medium, a servo driving portion to control the drive of the pickup, a counter to count a predetermined write execution time to notify an ending time of the write execution time, and a controller to control the servo driving portion until the controller is notified of the ending time of the counter to allow the write data to be written onto the writing medium when a write request signal is applied from the key input portion, to stop the write operation, and to control the count of the counter to change the ending time of the write execution time when the request signal for pausing the write operation is applied from the key input portion.

27 Claims, 4 Drawing Sheets

OPTICAL WRITING APPARATUS AND METHOD FOR CONTROLLING EXECUTION TIME OF WRITING THEREOF

CROSS-REFERENCE TO RELATED APPLICATION

This application claims the priority of Korean Patent Application No. 2004-46529, filed on Jun. 22, 2004, in the Korean Intellectual Property Office, the disclosure of which is incorporated herein in its entirety by reference.

BACKGROUND OF THE INVENTION

1. Field of the Invention

The present invention generally relates to an optical writing apparatus and a method to control the write execution time. More particularly, the present invention relates to an optical writing apparatus to decrement or maintain its write execution time during a pause period when the pause period is required while write data are written onto a writing medium by setting the write execution time, and a method to control its write execution time.

2. Description of the Related Art

An optical writing apparatus employs an optical disk driver to allow data to be written onto an optical disk. In the optical writing apparatus, data to be written onto the optical disk are written in a stream form, thus providing videos and sounds of high quality.

FIG. 1 is a schematic view for illustrating a conventional optical writing apparatus. Referring to FIG. 1, the optical writing apparatus includes a front panel 100 wherein a key input portion 110 is included to receive operating instructions corresponding to selection or setting of various functions, which are input by a user. The front panel 100 further includes a display 120 to display operations in progress and functions selected by the user, and a tray 130 to load and unload an optical disk (not shown).

A plurality of function keys 110a to 110g are typically arranged in the key input portion 110. The function keys 110a to 110g include a PLAY key 110a to reproduce images and sounds stored in the optical disk, a RECORD key 110b to perform a writing operation to write data to the optical disk, a STOP key 110c to stop the operation in progress, a PAUSE key 110d to pause the operation in progress, an OPEN/CLOSE key 110e to open or close the tray 130, a rewind key 110f, a fast forward key 110g, and direction keys 110h to select up, down, right and left directions in a menu.

After the user operates the OPEN/CLOSE key 110e to load the writing medium (i.e., the optical disk) onto the optical writing apparatus, the user operates the RECORD key 110b to allow write data to be written onto the writing medium. In this case, the user may operate the direction keys 110h to set a writing time when the write data are written onto the writing medium using the menu provided in the optical writing apparatus.

When the write execution time is set, the optical writing apparatus gradually decrements the write execution time while the writing operation is in progress, and stops the writing operation when the write execution time reaches zero.

When the user does not pay attention to the writing operation or when contents that the user does not want to write are provided from an external equipment connected to the optical writing apparatus, the user operates the PAUSE key 100d to pause the writing operation. The conventional optical writing apparatus decrements the preset write execution time in a paused state of the writing operation as is done in a state of the writing operation, or does not allow the write execution time to be decremented in the paused state of the writing operation.

In other words, functions of decrementing and maintaining the write execution time in the paused state are predetermined to allow performance of any one of these functions in the paused state of the conventional optical writing apparatus.

As a result, there is a need for the user to be able to decrement or maintain the write execution time in the paused state.

SUMMARY OF THE INVENTION

It is one aspect of the present invention to provide an optical writing apparatus and a method to control its write execution time, which gradually decrements or does not decrement the write execution time in the paused state of the writing operation when the pause operation is required during the writing operation in the optical writing apparatus.

According to one aspect of the present invention, an optical writing apparatus, comprises a pickup to write write data onto a writing medium; a servo driving portion to control the drive of the pickup; a counter to count a predetermined write execution time and to notify an ending time, of the write execution time; a key input portion to which at least one request signal is applied; and a controller to control the servo driving portion until the controller is notified of an ending time of the counter to allow the write data to be written onto the writing medium when a write request signal is applied from the key input portion, and to stop the write operation and control the count of the counter to change the ending time of the write execution time when the request signal to pause the write operation is applied from the key input portion.

According to an aspect of the invention, the controller controls the count of the counter to be stopped after the controller stops the write operation.

According to an aspect of the invention, the controller controls the counter to continue counting after the controller stops the write operation.

According to an aspect of the invention, the controller allows the write data to be written onto the writing medium by controlling the servo driving portion when a write request signal is applied from the key input portion in the stopped state of the writing operation.

According to an aspect of the invention, the controller allows the writing operation to be stopped by controlling the servo driving portion when the controller is notified of an ending time of the write execution time from the counter.

According to other aspect of the present invention, a method to control a write execution time of an optical writing apparatus comprises applying a write request signal; setting a predetermined write execution time for write data to be written onto a writing medium; writing the write data onto the writing medium; counting the predetermined write execution time from the time that the write data are written onto the writing medium; determining whether the write execution time is counted while the writing is paused when the write request signal for pausing the writing is applied; stopping the writing of the write data; and changing an ending time of the write execution time in response to the determination of the write execution time.

According to an aspect of the invention, the determining whether the write execution time is counted, an ending time of the write execution time is incremented by an amount of time corresponding to the paused writing period when stopping counting is determined.

According to an aspect of the invention, the determining whether the write execution time is counted, the ending time of the write execution time is not changed when continuing the counting is determined.

According to an aspect of the invention, the write request signal is applied in the paused state of the writing operation, the method further comprises writing the write data onto the writing medium.

When the write execution time reaches its ending time, the method further comprises stopping the writing operation.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
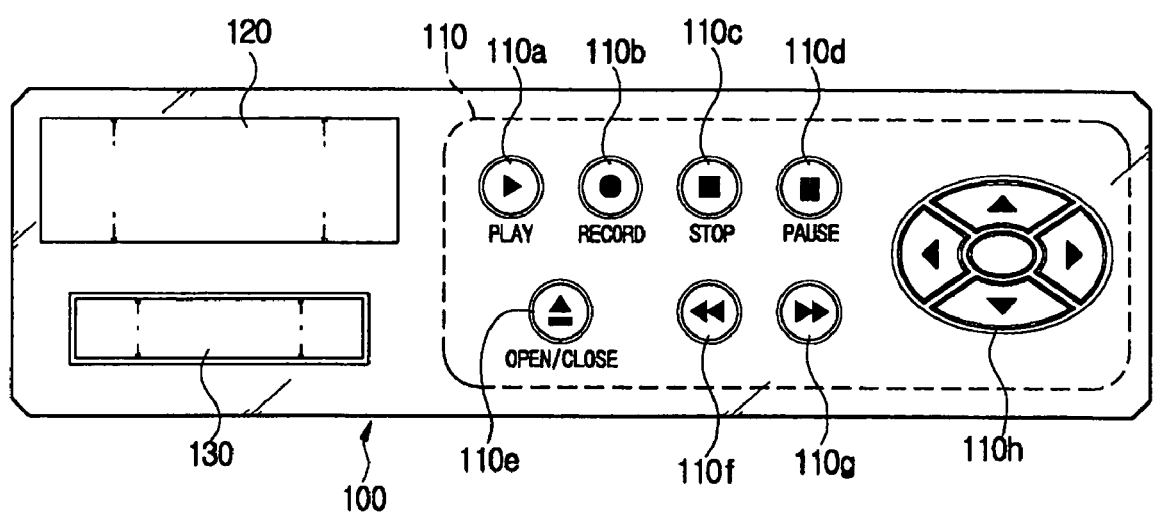
FIG. 1 is a schematic diagram for illustrating a front panel of a conventional optical writing apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
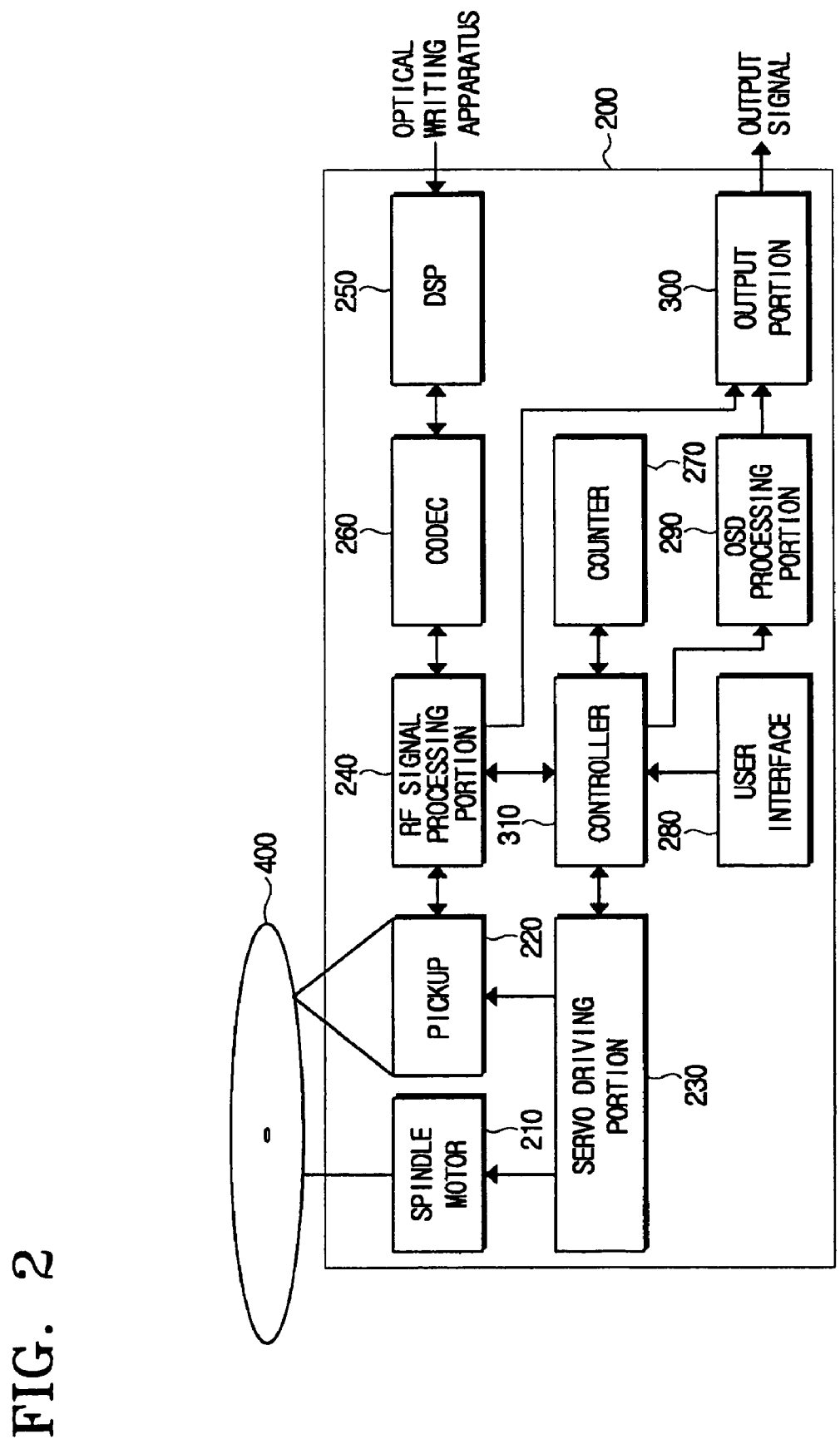
FIG. 2 is a block diagram of an optical writing apparatus in accordance with an exemplary embodiment of the present invention.

FIG. 2 is a block diagram of an optical writing apparatus in accordance with an exemplary embodiment of the present invention. An optical writing apparatus 200 writes predetermined write data onto an optical disk 400, and it may be connected to various image sources such as a computer, a broadcast receiving antenna, a TV, and/or a hard disk drive or other attached reproducing player such as a camcorder. A Digital Video Disk (DVD) recorder may be exemplified for the optical writing apparatus. However, it is understood that other media, such as Compact Discs, Blu-ray discs, Advanced Optical Disks, and/or magneto optical disks may be used.

As is shown in FIG. 2, the optical writing apparatus 200, according to an embodiment of the present invention includes a spindle motor 210, a pickup 220, a servo driving portion 230, a Radio Frequency (RF) signal processing portion 240, a Digital Signal Processor (DSP) 250, a codec 260, a counter 270, a user interface 280, an On Screen Display (OSD) processing portion 290, an output portion 300, and a controller 310.

The spindle motor 210 rotates the optical disk 400 to be loaded. The pickup 220 writes signals processed by the DSP 250, the codec 260, and the RF signal processing portion 240 onto the optical disk 400. While not required, the optical pickup 220 reads out written signals such that the apparatus further reproduces the optical disk 400. The servo driving portion 230 controls driving the pickup 220 and the spindle motor 210. The RF signal processing portion 240 filters and shapes signals detected by the pickup 220, outputs the filtered and shaped signals through the output portion 300 as binary signals, and provides signals input from the codec 260 to the pickup 220. The DSP 250 converts the write data input to the optical writing apparatus 200 to digital data, and performs signal processing such as error correction to convert them into write formats.

The codec 260 encodes the write data of the write format converted by the DSP 250 and decodes the encoded data, wherein output values of the codec 260 are input to the RF signal processing portion 240. The counter 270 counts the write execution time under the control of the controller 310, and notifies an ending time of the write execution time. The counting of the write execution time may be classified into one method to decrement the time from a predetermined time in a step-by-step manner and the other method to increment the time toward the predetermined time in the step-by-step manner. The former method will be described in the present embodiment, but it is understood that either method, or combinations thereof, may be used.

The user interface 280 applies key operating signals applied from the user through the key input portion 110 to the controller 310. The key input portion 110 may be arranged in the front panel 100 of the optical writing apparatus as shown in FIG. 1, may be a remote controller (not shown), to transmit infrared signals corresponding to respective request signals, or may be otherwise received by the apparatus, such as across a network.

Referring to FIG. 1, the key operating signals applied from the user interface 280 to the controller 310 will be first described. The controller 310 is applied with a reproduction request signal from the PLAY key 110a, a writing/writing resume request signal from the RECORD key 110b, a stop request signal from the STOP key 110c, a pause request signal from the PAUSE key 110d, an open/close request signal from the OPEN/CLOSE key 110e, a rewind request signal from the rewind key 110f, and a fast forward request signal from the fast forward key 110g. In addition, up, down, right and left direction keys 110h may be further arranged to set the menu with respect to various functions of the optical writing apparatus 200.

The OSD processing portion 290 adds the OSD menu function to allow the user to set the write execution time of his/her own will.

The output portion 300 provides the OSD menu processed by the OSD processing portion 290 to the user. Output signals, which correspond to the OSD menu output from the output portion 300, may be displayed on an external equipment that is connected to the optical writing apparatus 200, which allows the user to move the direction keys 110h to up, down, right and left directions to thus set the write execution time. While not required, it is understood that the apparatus may be integral with the output device, such as in a combined recorder-display.

When the write execution time is set by the OSD menu to set the write execution time displayed through the output portion 300, the set write execution time is input to the controller 310 through the user interface 280.

The controller 310 allows the write data to be written onto the optical disk 400 by controlling the servo driving portion 230 until the controller 310 is notified of the ending time of the write execution time when a write request signal is applied from the user interface 280 through the RECORD key 110b of the key input portion 110.

The controller 310 allows the writing operation to be stopped by controlling the servo driving portion 230 when a stop request signal and a pause request signal are applied from the user interface 280 through the STOP key 110c and the PAUSE key 110d of the key input portion 110.

The controller 310 allows the write data to be written onto the optical disk 400 by controlling the servo driving portion 230 when a request signal to resume the write is applied from the user interface 280 through the RECORD key 110b of the key input portion 110 in the pause state of the writing operation.

The controller 310 allows the time counting to be decremented from the write execution time in a step-by-step manner by controlling the counter 270 when the write execution time is input from the user interface 280 through the direction keys 110h of the key input portion 110.

The controller 310 allows the counting of the write execution time to be continued by controlling the counter 270 in the case that the counting of the write execution time needs to be continued even when the writing operation is in a paused period. The ending time of the write execution time is not changed in this case.

The controller 310 allows the counting operation to be paused by controlling the counter 270 when the predetermined write execution time is maintained during the paused period of the writing operation. The ending time of the write execution time is incremented by an amount of time corresponding to the paused period of the writing operation in this case.

The controller 310 controls the servo driving portion 230 to stop the writing operation when the write execution time is expired (that is, when it reaches the time of zero) by the counter 270.

Figure 3:
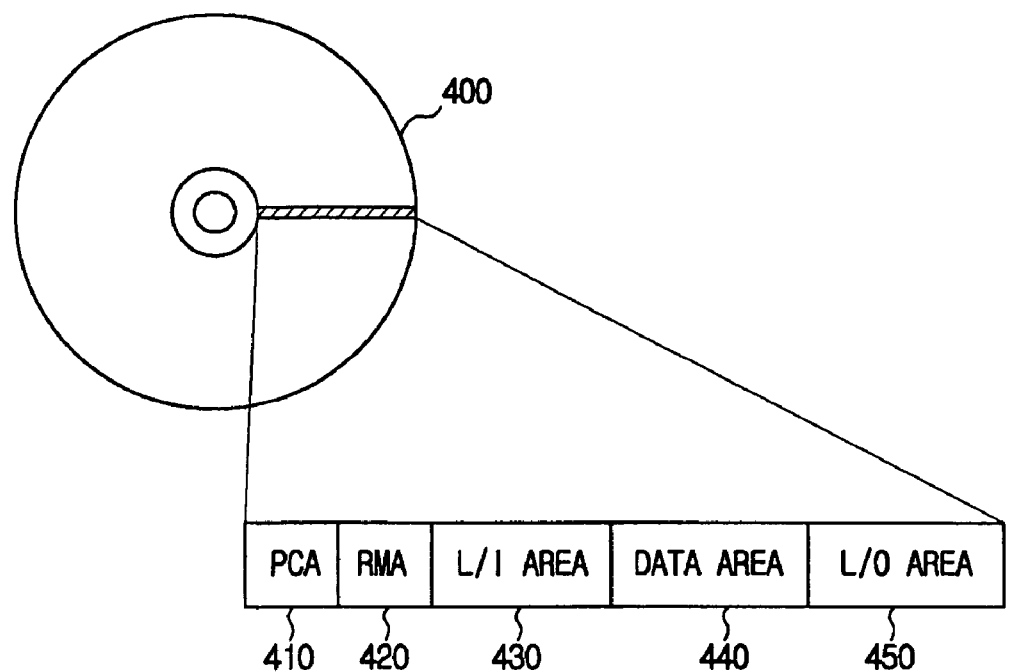
FIG. 3 is a diagram illustrating a data structure of the optical disk shown in FIG. 2.

FIG. 3 is a diagram illustrating a data structure of the optical disk shown in FIG. 2. Typical examples of the optical disk 400 may include storage media such as CD±R and DVD±R which allow one time writing to be carried out, and CD±RW, DVD±RW, or DVD-RAM which allows repeatable writing to be carried out. However, it is understood that other media may be used, such as magnetic, magneto optical, as well as other types of optical media such as Blu-ray disks and Advanced Optical Disks.

As shown in FIG. 3, the optical disk according to an embodiment of the present invention includes a Power Calibration Area (PCA) 410, a Record Management Area (RMA) 420, a Lead-in Area (L/I Area) 430, a Data Area 440, and a Lead-out Area (L/O) Area 450. Write data applied from external equipment (not shown) are applied through the optical writing apparatus 200 to an optical disk 400 that includes a plurality of such areas. While described as external equipment, it is understood that the apparatus may include the other equipment, such as in the case of DVD-VHS players and DVD recorders having television tuners.

Figure 4:
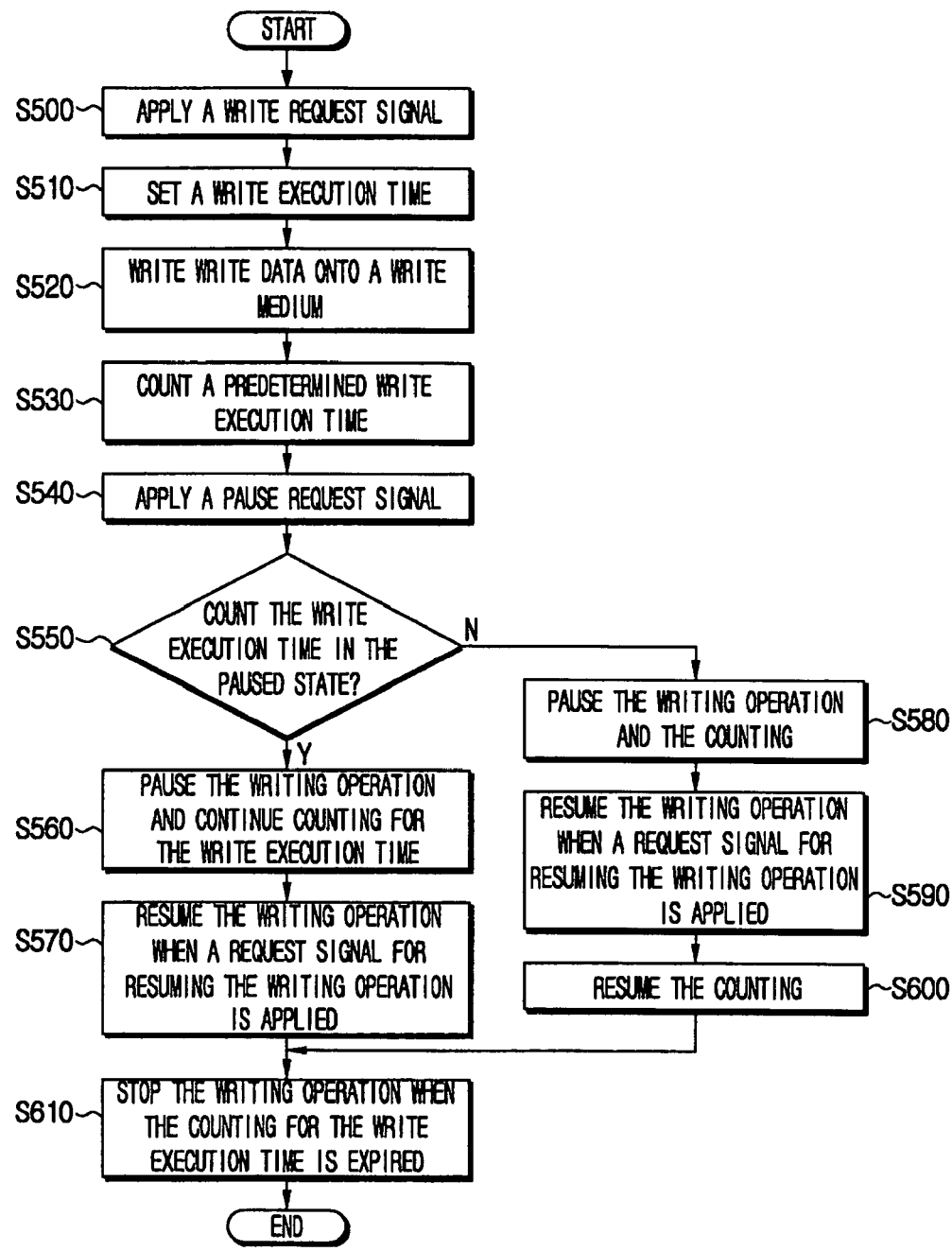
FIG. 4 is a flowchart illustrating operations of a method to control a write execution time of the optical writing apparatus in accordance with an exemplary embodiment of the present invention.

FIG. 4 is a flowchart illustrating operations of a method to control a write execution time of the optical writing apparatus in accordance with an exemplary embodiment of the present invention. Hereinafter, the method to control the write execution time of the optical writing apparatus according to the exemplary embodiment of the present invention will be described with reference to FIG. 1 to FIG. 4.

When the user operates the OPEN/CLOSE key 110e of the optical writing apparatus 200 connected to the external equipment to load the optical disk 400 and operate the RECORD key 110b, a write request signal is applied from the user interface 280 to the controller 310 at operation 500.

The controller 310 controls the OSD processing portion 290 to allow the OSD menu to set the write execution time to be provided to the user through the output portion 300, and the user operates the direction key 110h to set the write execution time needed to write the write data onto the optical disk 400 at operation 510.

When the write execution time is set, the controller 310 controls the servo driving portion 230 to allow the write data to be written onto the optical disk 400 at operation 520.

When the writing operation is initiated for the write data, the controller 310 controls the counter 270 to start counting to decrement the predetermined write execution time at operation 530.

While the writing operation and the counting for the writing operation are carried out and if a paused state is requested at operation 540, the user is asked to determine whether the counting for the write execution time is continued in the paused state of the writing operation at operation 550 when a pause request signal of the writing operation is applied from the user interface 280 at operation 540. The inquiry of determining the count for the write execution time is delivered using the OSD menu through the OSD processing portion 290 and the output portion 300. However, it is understood that the inquiry may be otherwise made, such as using another display on the apparatus (such as the display 120 of FIG. 1) or another display associated with the apparatus.

When continuing counting is determined for the write execution time at the operation 550 (i.e., "Y" is selected), the controller 310 controls the servo driving portion 230 to stop the writing operation, and allows the counter 270 to continue counting at operation 560. In this case, the ending time of the write execution time is not changed. After the writing operation is paused, the controller 310 controls the servo driving portion 230 to resume the writing operation when a request signal to resume the writing operation is applied from the user interface 280 at operation 570.

When stopping counting is determined the write execution time in the paused state of the writing operation at the operation 550 (i.e., "N" is selected), the controller 310 controls the servo driving portion 230 to stop the writing operation, and controls the counter 270 to pause the counting for the write execution time at operation 580. The ending time of the write execution time is incremented by an amount of time corresponding to the paused writing time period. When a request signal to resume the writing operation is applied from the user interface 280 after the writing operation is paused, the controller 310 controls the servo driving portion 230 to resume the writing operation at operation 590, and controls the counter 270 to resume counting for the write execution time that has been paused at operation 600.

When the counting for the write execution time is expired by the counter 270 after the writing operation is resumed (that is, when it reaches the ending time of the write execution time), the controller 310 controls the servo driving portion 230 to stop the writing operation at operation 610.

In light of the foregoing, the optical writing apparatus and the method to control its write execution time enables the user to select, readily, whether to continue or to stop the count of the writing execution time during the pause period when the pause period is required while write data are written onto a writing medium. When the count ends, the writing operation automatically terminates, thus providing convenience for the usage of the optical writing apparatus.

The present invention may also be embodied as computer readable codes on a computer readable recording medium. The computer readable recording medium is any data storage device that may store data which may be thereafter read by a computer system having at least one general and/or special purpose computer. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium may also be distributed over network coupled computer systems so that the computer readable code is stored and executed in a distributed fashion.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical writing and/or reading apparatus, comprising:
    a pickup to write write data onto a writing medium;
    a servo driving portion to control the drive of the pickup;
    a counter to count a predetermined write execution time and to notify an ending time of the write execution time;
    a key input portion to which at least one request signal is applied, the at least one request signal comprising one or more of a write request signal and a pause request signal; and
    a controller to control the servo driving portion until the controller is notified of the ending time by the counter to allow the write data to be written onto the writing medium when the write request signal is applied from the key input portion, to stop the write operation, and to control the count of the counter to change the ending time of the write execution time when a pause request signal for pausing the write operation is applied from the key input portion.

2. The optical writing and/or a reading apparatus as recited in claim 1, wherein the controller stops the counting of the counter after stopping the writing operation.

3. The optical writing and/or apparatus as recited in claim 1, wherein the controller continues the counting of the counter after stopping the writing operation.

4. The optical writing and/or apparatus as recited in claim 1, wherein the controller writes the write data onto the writing medium by controlling the servo driving portion when the write request signal is applied from the key input portion in a stopped state of the writing operation.

5. The optical writing and/or apparatus as recited in claim 1, wherein the controller stops the writing operation by controlling the servo driving portion when the controller is notified of the ending time of the writing execution time by the counter.

6. A method to control a write execution time of an optical writing apparatus, comprising:
    applying a write request signal;
    setting a predetermined write execution time for write data to be written onto a writing medium based on the write request signal;
    writing the write data onto the writing medium based on the write request signal;
    counting to the predetermined write execution time from a time that the write data begin to be written onto the writing medium;
    determining whether the predetermined write execution time is counted while the writing is paused when a pause request signal to pause the writing is applied;
    stopping the writing of the write data if the pause request signal is received; and
    changing an ending time of the write execution time according to a result of the determination.

7. The method as recited in claim 6, wherein an ending time of the write execution time is incremented by an amount of time corresponding to the paused writing when stopping counting is determined in the determining whether the write execution time is counted.

8. The method as recited in claim 6, wherein an ending time of the write execution time is not changed when it is determined to continue counting in the determining whether the write execution time is counted.

9. The method as recited in claim 6, further comprising writing the write data onto the writing medium when a write request signal is applied in the stopped state of the writing operation.

10. The method as recited in claim 6, further comprising stopping the writing operation when the write execution time reaches the ending time during the counting.

11. A computer readable medium having recorded thereon computer readable instructions used by a computer to implement a method to control a write execution time of an optical writing apparatus, the instructions comprising:
    applying a write request signal;
    setting a predetermined write execution time for write data to be written onto a writing medium based on the write request;
    writing the write data onto the writing medium based on the write request;
    counting to the predetermined write execution time from a time that the write data begin to be written onto the writing medium;
    determining whether the predetermined write execution time is counted while the writing is paused when a pause request signal to pause the writing is applied;
    stopping the writing of the write data if the pause request signal is received; and
    changing an ending time of the write execution time according to a result of the determination.

12. The computer readable medium as recited in claim 11, wherein an ending time of the write execution time is incremented by an amount of time corresponding to the paused writing when stopping counting is determined in the determining whether the write execution time is counted.

13. The computer readable medium as recited in claim 11, wherein an ending time of the write execution time is not changed when it is determined to continue counting in the determining whether the write execution time is counted.

14. The computer readable medium as recited in claim 11, further comprising writing the write data onto the writing medium when a write request signal is applied in the stopped state of the writing operation.

15. The computer readable medium as recited in claim 11, further comprising stopping the writing operation when the write execution time reaches the ending time during the counting.

16. A computer readable medium having recorded thereon computer readable instructions to control a write execution time of an optical writing apparatus, the instructions comprising:
    applying a write request signal;
    setting a predetermined write execution time for write data to be written onto a writing medium based on the applied write request signal;
    writing the write data onto the writing medium based on the applied write request signal;
    counting the predetermined write execution time from a time that the write data are written onto the writing medium;
    applying a pause request signal during the writing and counting;

receiving a selection signal indicating whether the predetermined write execution time is counted to be while the writing is paused; and if the predetermined write execution time is to be counted while the writing is paused, pausing the writing operation and continuing counting for the predetermined write execution time, and stopping the writing operation when the counting for the write execution is expired; and if the predetermined write execution time is uncounted while the writing is paused, pausing the writing operation and the counting.

17. The computer readable medium as recited in claim 16, wherein an ending time of the write execution time is incremented by an amount of time corresponding to the paused writing when stopping counting is determined in the determining whether the write execution time is counted.

18. The computer readable medium as recited in claim 16, wherein an ending time of the write execution time is not changed when it is determined to continue counting in the determining whether the write execution time is counted.

19. The computer readable medium as recited in claim 16, further comprising writing the write data onto the writing medium when a write request signal is applied in the stopped state of the writing operation.

20. The computer readable medium as recited in claim 16, further comprising stopping the writing operation when the write execution time reaches the ending time.

21. A recording and/or reproducing apparatus, comprising:
a digital signal processor to convert input write data to digital data and to perform signal processing to convert the digital data into write formats;
a codec, coupled to the digital signal processor and to a radio frequency signal processor, to encode the write data of the write formats, to decode encoded data, and to output values to the radio frequency signal processing portion;
the radio frequency signal processing portion, coupled to a pickup and a controller, to filter and shape the signal detected by the pickup into a binary signal and to provide signals input from the codec to the pickup;
a user interface, coupled to the controller, to apply key operating signals applied from the user to the controller and to input a write execution time to the controller;
the controller to control a servo driving portion during a period following receiving a pause;
a spindle motor to rotate an optical medium to be loaded;
the pickup to write signals processed by the digital signal processor onto the optical medium;
the servo driving portion, coupled to the controller, the pickup and the spindle motor, to control operations of the pickup and the spindle motor;
a counter, coupled to the controller, to count the write execution time under a control of the controller, and to notify an ending time of the write execution time;
an On Screen Display processing portion, coupled to the controller, to add an On Screen Display menu function to allow the user to set the write execution time; and
an output portion, coupled to the On Screen Display processing portion and the radio frequency processing portion, to output the filtered and shaped signals as binary signals and to provide an On Screen Display processed by the On Screen Display processing portion to the user to allow the user to set the write execution time.

22. The optical recording apparatus as recited in claim 21, wherein the key operating signals applied from the user interface to the controller comprise one of: a PLAY key, a writing/writing resume request signal from a RECORD key, a stop request signal from a STOP key, a pause request signal from a PAUSE key, an open/close request signal from an OPEN/CLOSE key, a rewind request signal from a rewind key, or a fast forward request signal from a fast forward key.

23. The optical recording apparatus as recited in claim 21, wherein the controller is arranged to:
controls the apparatus to write data onto an optical disk until the controller is notified of an ending time of the write execution time when a write request signal is applied from the user interface,
controls the apparatus to stop a writing operation by controlling the servo driving portion when a stop request signal and a pause request signal are applied from the user interface,
controls the apparatus to write data onto the optical disk by controlling the servo driving portion when a request signal to resume the write is applied from the user interface,
controls the apparatus to decrement a time counting from a write execution time in a step-by-step manner by controlling a counter when the write execution time is input from the user interface,
controls the apparatus to count the write execution time to be continued by controlling the counter in a case that the counting of the write execution time is to be continued even when the writing operation is in a paused period, not changing an ending time of the write execution time,
controls the apparatus to pause the counting by controlling the counter when the write execution time is maintained during the paused period of the writing operation, wherein the ending time of the write execution time is incremented by an amount of time corresponding to the paused period of the writing operation, and
controls the apparatus to stop the writing operation when the write execution time is expired.

24. The method as recited in claim 7, wherein an ending time of the write execution time is not changed when it is determined to continue counting in the determining whether the write execution time is counted.

25. The computer readable medium as recited in claim 12, wherein an ending time of the write execution time is incremented by an amount of time corresponding to the paused writing when stopping counting is determined in the determining whether the write execution time is counted.

26. The computer readable medium as recited in claim 16, further including resuming the writing operation when a request signal for resuming the writing operation is applied or when a request signal for resuming the writing application is applied.

27. A writing and/or reading apparatus, comprising:
a pickup to write write data onto a writing medium;
a servo driving portion to control the drive of the pickup;
a counter to count a predetermined write execution time and to notify an ending time of the write execution time;
an input portion to which at least one request signal is applied, the at least one request signal comprising one or more of a write request signal, and a pause request signal; and
a controller to control the servo driving portion until the controller is notified of the ending time by the counter to control writing the write data onto the writing medium when the write request signal is applied from the input portion, to stop the write operation, and to control the counter to stop according to a first selection and to control the counter to continue counting according to a second selection when a pause request signal for pausing the write operation is applied from the input portion.

* * * * *

UNITED STATES PATENT AND TRADEMARK OFFICE
CERTIFICATE OF CORRECTION

PATENT NO. : 7,397,749 B2  Page 1 of 1
APPLICATION NO. : 10/962535
DATED : July 8, 2008
INVENTOR(S) : Eun-mi Kim It is certified that error appears in the above-identified patent and that said Letters Patent is hereby corrected as shown below:

Title Page, Column 2 Item [56] (Above OTHER PUBLICATIONS), Line 1, above "OTHER PUBLICATIONS" insert
--FOREIGN PATENT DOCUMENTS
WO    WO01/35646    5/2001--.

Title Page, Column 2 Item [56] (OTHER PUBLICATIONS), Line 4, below "(in English)." insert --European Search Report for corresponding European Patent Application No. 05252848.6 dated August 7, 2007 (2 pgs), (in English).--.

Signed and Sealed this

Fourth Day of November, 2008

JON W. DUDAS
*Director of the United States Patent and Trademark Office*